US012809091B2

(12) United States Patent
Song et al.

(10) Patent No.: US 12,809,091 B2
(45) Date of Patent: Nov. 24, 2026

(54) MULTI-TIP OPTICAL COUPLING DEVICES

(71) Applicant: Taiwan Semiconductor Manufacturing Company, Ltd., Hsinchu (TW)

(72) Inventors: Weiwei Song, San Jose, CA (US); Chan-Hong Chern, Palo Alto, CA (US); Chewn-Pu Jou, Hsinchu (TW); Stefan Rusu, Sunnyvale, CA (US); Min-Hsiang Hsu, Hsinchu (TW)

(73) Assignee: Taiwan Semiconductor Manufacturing Company, Ltd., Hsinchu (TW)

( * ) Notice: Subject to any disclaimer, the term of this patent is extended or adjusted under 35 U.S.C. 154(b) by 847 days.

(21) Appl. No.: 17/876,779

(22) Filed: Jul. 29, 2022

(65) Prior Publication Data

US 2022/0365281 A1 Nov. 17, 2022

Related U.S. Application Data

(62) Division of application No. 17/097,270, filed on Nov. 13, 2020, now Pat. No. 11,860,421.

(51) Int. Cl.
*G02B 6/30* (2006.01)
*G02B 6/26* (2006.01)

(52) U.S. Cl.
CPC ............. *G02B 6/305* (2013.01); *G02B 6/262* (2013.01); *G02B 6/30* (2013.01)

(58) Field of Classification Search
CPC .......... G02B 6/262; G02B 6/30; G02B 6/305; G02B 6/122
See application file for complete search history.

(56) References Cited

U.S. PATENT DOCUMENTS

| | | | |
|---|---|---|---|
| 8,031,991 | B2 | 10/2011 | Webster et al. |
| 9,638,857 | B2 | 5/2017 | Bai et al. |
| 10,018,789 | B2 | 7/2018 | Wang et al. |
| 11,204,469 | B1 | 12/2021 | Krueger et al. |
| 2004/0057667 | A1 | 3/2004 | Yamada et al. |
| 2009/0003770 | A1 | 1/2009 | Gill et al. |

(Continued)

FOREIGN PATENT DOCUMENTS

| | | |
|---|---|---|
| CN | 106461866 A | 2/2017 |
| CN | 106461872 A | 2/2017 |

(Continued)

*Primary Examiner* — Michael P Mooney

(74) *Attorney, Agent, or Firm* — Sterne, Kessler, Goldstein & Fox P.L.L.C.

(57) ABSTRACT

An optical system with different optical coupling device configurations and a method of fabricating the same are disclosed. An optical system includes a substrate, a waveguide disposed on the substrate, an optical fiber optically coupled to the waveguide, and an optical coupling device disposed between the optical fiber and the waveguide. The optical coupling device configured to optically couple the optical fiber to the waveguide. The optical coupling device includes a dielectric layer disposed on the substrate, a semiconductor tapered structure disposed in a first horizontal plane within the dielectric layer, and a multi-tip dielectric structure disposed in a second horizontal plane within the dielectric layer. The first and second horizontal planes are different from each other.

20 Claims, 12 Drawing Sheets

(56) References Cited

U.S. PATENT DOCUMENTS

| | | | | |
|---|---|---|---|---|
| 2009/0324163 | A1 | 12/2009 | Dougherty et al. | |
| 2012/0307857 | A1 | 12/2012 | Oh et al. | |
| 2015/0277036 | A1 | 10/2015 | Jiang et al. | |
| 2016/0202421 | A1 | 7/2016 | Chen | |
| 2016/0327746 | A1 | 11/2016 | Mathai et al. | |
| 2016/0327748 | A1 | 11/2016 | Stern et al. | |
| 2019/0154919 | A1 | 5/2019 | Teng et al. | |
| 2019/0170936 | A1 | 6/2019 | Qi et al. | |
| 2019/0384003 | A1 * | 12/2019 | Painchaud | G02B 6/2821 |
| 2019/0391336 | A1 | 12/2019 | Wong et al. | |
| 2023/0314730 | A1 * | 10/2023 | Bian | G02B 6/125<br>385/43 |

FOREIGN PATENT DOCUMENTS

| | | | |
|---|---|---|---|
| CN | 105209947 | B | 12/2018 |
| EP | 2442165 | A1 | 4/2012 |
| WO | WO2016/036734 | A1 | 3/2016 |

* cited by examiner

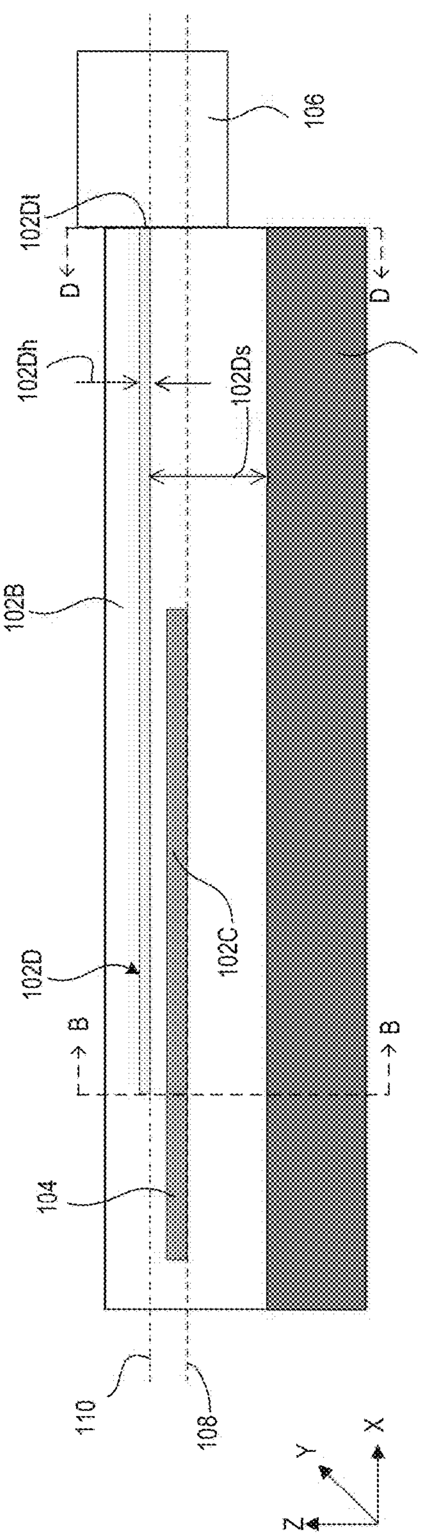
Fig. 1B
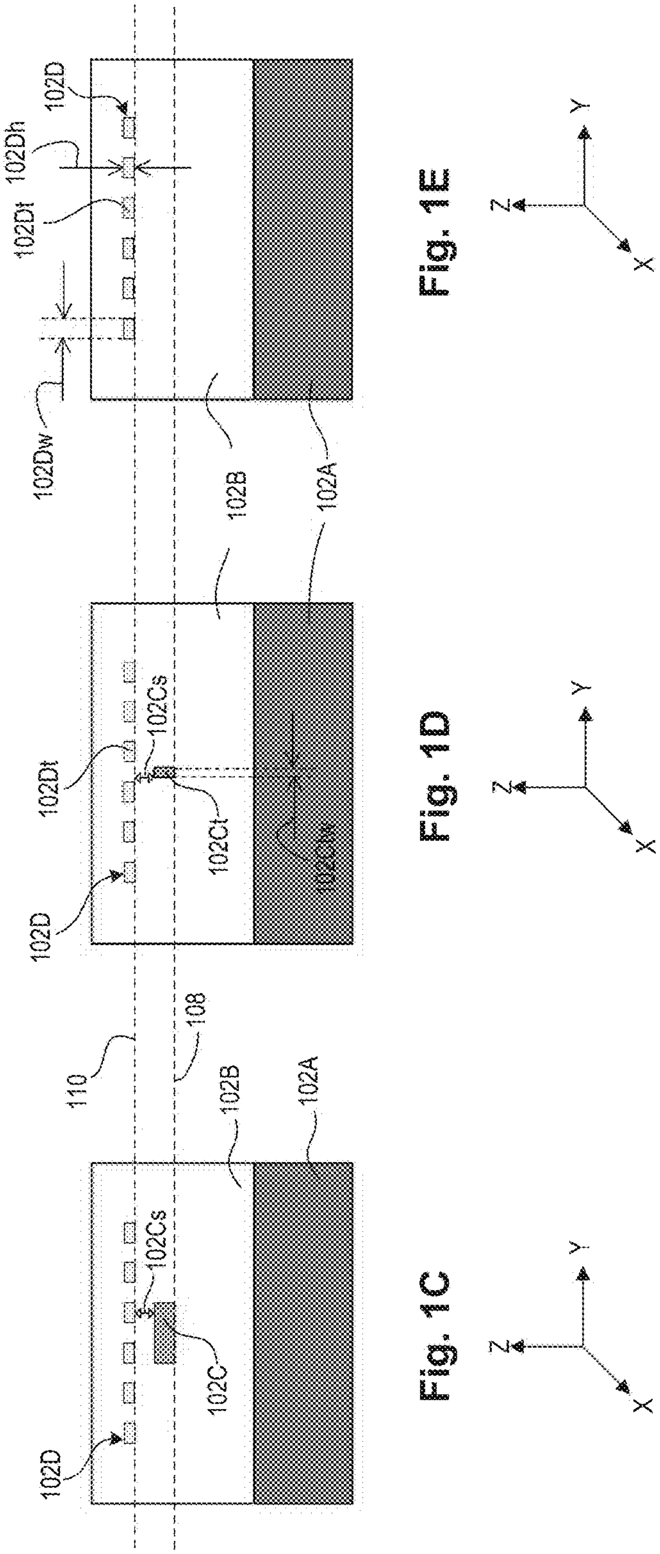
Fig. 1C
Fig. 1D
Fig. 1E 102D
102Dh
102Dt
102B
102A

102Cs
102Ct 110
108
102C

X
Y
Z 102D
102Dh
102Dt
102B
102A

Y
Z
X
102D
102Cs
102Ct 110
108
102Cs
102C

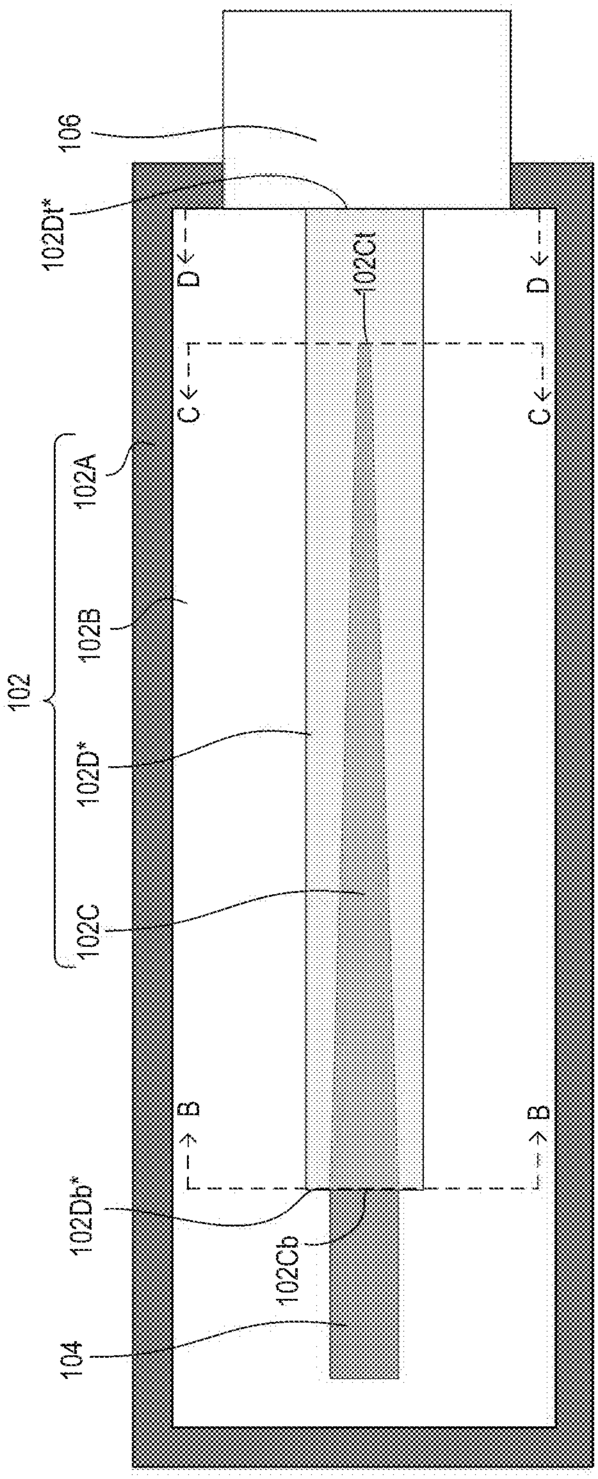
Fig. 5A
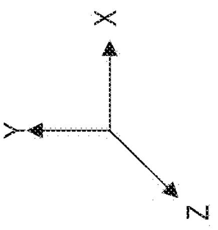

MULTI-TIP OPTICAL COUPLING DEVICES

CROSS-REFERENCE TO RELATED APPLICATIONS

This application is a divisional of U.S. patent application Ser. No. 17/097,270, titled "Multi-Tip Optical Coupling Devices," filed on Nov. 13, 2020, which is incorporated herein by reference in its entirety.

BACKGROUND

One of the approaches to coupling single mode optical fibers to waveguides silicon (Si) photonic integrated circuits (PIC) is to optically couple the lateral sides of the optical fibers and Si-PIC with optical coupling devices, such as edge couplers, Edge couplers reduce the optical mode size mismatch between the optical fibers and the waveguides for light to transfer between the optical fibers and Si-PICS. Edge coupling works over a broad wavelength range, can achieve polarization insensitive coupling (e.g., coupling both TE/TM modes), and is compatible with semiconductor technology. However, the scaling down of Si-PIC dimensions to meet the increasing demand for faster processing systems has increased the complexity of manufacturing edge couplers with high optical coupling efficiencies.

BRIEF DESCRIPTION OF THE DRAWINGS

Aspects of this disclosure are best understood from the following detailed description when read with the accompanying figures. It is noted that, in accordance with the common practice in the industry, various features are not drawn to scale. In fact, the dimensions of the various features may be arbitrarily increased or reduced for clarity of discussion.

FIGS. 1A, 1B-1E, and 1F illustrate a top view, cross-sectional views, and device characteristics of an optical system, in accordance with some embodiments.

FIGS. 5A-5D illustrate top and cross-sectional views of an optical system, in accordance with some embodiments.

Illustrative embodiments will now be described with reference to the accompanying drawings. In the drawings, like reference numerals generally indicate identical, functionally similar, and/or structurally similar elements.

DETAILED DESCRIPTION

Figure 1A:
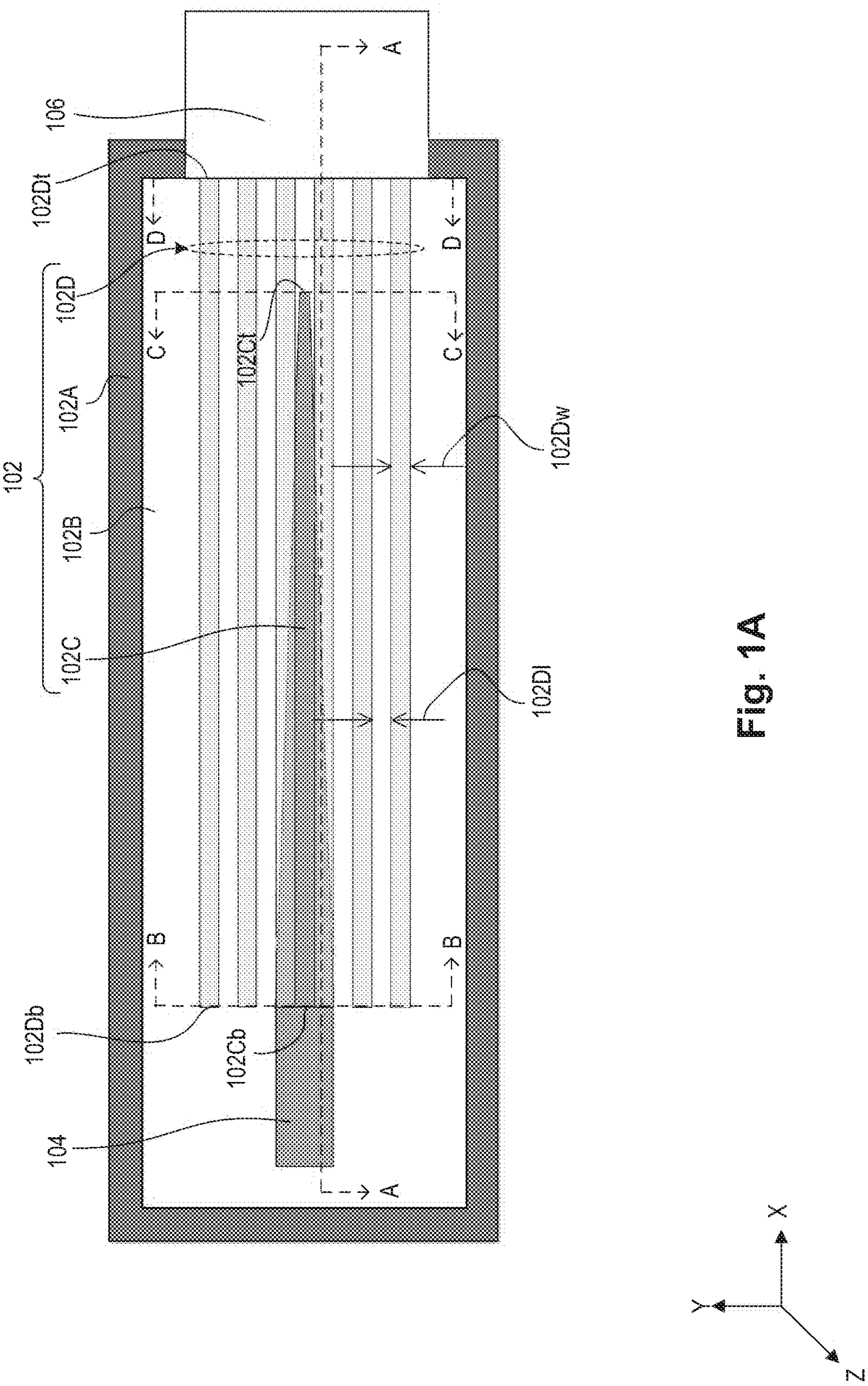

The following disclosure provides many different embodiments, or examples, for implementing different features of the provided subject matter. Specific examples of components and arrangements are described below to simplify the present disclosure. These are, of course, merely examples and are not intended to be limiting. For example, the process for forming a first feature over a second feature in the description that follows may include embodiments in Which the first and second features are formed in direct contact, and may also include embodiments in which additional features may be formed between the first and second features, such that the first and second features may not be in direct contact. As used herein, the formation of a first feature on a second feature means the first feature is formed in direct contact with the second feature. In addition, the present disclosure may repeat reference numerals and/or letters in the various examples. This repetition does not in itself dictate a relationship between the various embodiments and/or configurations discussed.

Spatially relative terms, such as "beneath," "below," "lower," "above," "upper," and the like may be used herein for ease of description to describe one element or feature's relationship to another element(s) or feature(s) as illustrated in the figures. The spatially relative terms are intended to encompass different orientations of the device in use or operation in addition to the orientation depicted in the figures. The apparatus may be otherwise oriented (rotated 90 degrees or at other orientations) and the spatially relative descriptors used herein may likewise be interpreted accordingly.

It is noted that references in the specification to "one embodiment," "an embodiment," "an example embodiment," "exemplary," etc., indicate that the embodiment described may include a particular feature, structure, or characteristic, but every embodiment may not necessarily include the particular feature, structure, or characteristic. Moreover, such phrases do not necessarily refer to the same embodiment. Further, when a particular feature, structure or characteristic is described in connection with an embodiment, it would be within the knowledge of one skilled in the art to effect such feature, structure or characteristic in connection with other embodiments whether or not explicitly described.

It is to be understood that the phraseology or terminology herein is for the purpose of description and not of limitation, such that the terminology or phraseology of the present specification is to be interpreted by those skilled in relevant art(s) in light of the teachings herein.

As used herein, the term "high-k" refers to a high dielectric constant. In the field of semiconductor device structures and manufacturing processes, high-k refers to a dielectric constant that is greater than the dielectric constant of $SiO_2$ (e.g., greater than 3.9).

As used herein, the term "low-k" refers to a low dielectric constant. In the field of semiconductor device structures and manufacturing processes, low-k refers to a dielectric constant that is less than the dielectric constant of $SiO_2$ (e.g., less than 3.9).

As used herein, the term "low refractive index" refers to a refractive index that is less than the refractive index of Si (e.g., less than 3.5).

As used herein, the term "nanostructured" defines a structure, layer, and/or region as having a horizontal dimension (e.g., along an X- and/or Y-axis) and/or a vertical dimension (e.g., along a Z-axis) less than, for example, 100 nm.

In some embodiments, the terms "about" and "substantially" can indicate a value of a given quantity that varies within 5% of the value (e.g., ±1%, ±2%, ±3%, ±4%, ±5% of the value). These values are merely examples and are not intended to be limiting. It is to be understood that the terms "about" and "substantially" can refer to a percentage of the values of a given quantity as interpreted by those skilled in relevant art(s) in light of the teachings herein.

Single mode optical fibers can have a relatively large core in comparison to Si waveguides on Si photonic integrated circuits, resulting in a larger optical mode field than the mode associated with the Si waveguides on the Si photonic integrated circuits. Direct optical coupling between the optical fibers and the Si waveguides on the Si photonic integrated circuits can result in high optical coupling losses and high optical signal losses due to the optical mode size mismatch and the refractive index mismatch between the optical fibers and the waveguides on the Si photonic integrated circuits. To reduce such optical mode size mismatch and refractive index mismatch, optical coupling devices (also referred to as "edge couplers") are used to optically couple the optical fibers to the Si waveguides on the Si photonic integrated circuits. Each of the optical coupling devices usually has a semiconductor tapered structure and a single tip dielectric structure surrounding the semiconductor tapered structure. The semiconductor tapered structure can include Si and the single tip dielectric structure can include silicon nitride (SiN). The index mismatch between SiN (e.g., refractive index about 2.0) and the optical fibers (e.g., refractive index about 1.45) is lower than the index mismatch between the optical fibers and the Si waveguides (e.g., refractive index about 3.5) on the Si photonic integrated circuits.

The single tip dielectric structures serve as single mode waveguides that are configured to collect light from the optical fibers and transfer the collected light to the semiconductor tapered structures. Ends of the single tip dielectric structures are optically coupled to lateral sides of the optical fibers and when light propagates along the single tip dielectric structure, it is evanescently coupled to the semiconductor tapered structures. The single tip dielectric structures are configured to have smaller optical mode size mismatch with the optical fibers than the optical mode size mismatch between the optical fibers and the Si waveguides on the Si photonic integrated circuits.

Similarly, the semiconductor tapered structures serve as single mode waveguides that are configured to collect light from the single tip dielectric structures and transfer the collected light to the Si waveguides on the Si photonic integrated circuits. Ends of the semiconductor tapered structures are optically coupled to the single tip dielectric structures and other ends of the semiconductor tapered structures are optically coupled to the lateral sides of the Si waveguides on the Si photonic integrated circuits. The semiconductor tapered structures are configured to have smaller optical mode size mismatch with the Si waveguides on the Si photonic integrated circuits than the optical mode size mismatch between the optical fibers and the Si waveguides on the Si photonic integrated circuits. Thus, the optical coupling devices serve as optical mode size converters to improve optical coupling efficiency between the optical fibers and the Si waveguides on the Si photonic integrated circuits.

The dielectric materials used for the single tip dielectric structures limits the optical mode sizes that can be obtained for the single tip dielectric structures, thus limiting the minimum optical mode size mismatch and the maximum optical coupling efficiency that can be achieved between the optical coupling devices and the optical fibers. This limitation is due to the complex processes to fabricate silicon nitride (SiN) based single tip dielectric structures with thick SiN layers (e.g., thickness of about 200 nm or greater or thickness of about 250 nm) to achieve the optimal optical coupling efficiency. The complex fabrication processes for SiN structures are required to protect underlying layers and/or structures from damages that may be induced during the processing (e.g., patterning, etching, and/or polishing) of the SiN material, which is a high-stress material. For example, to get SiN layer with thickness greater than 200 nm (e.g., about 200 nm to about 800 nm), multiple coating, patterning, etching, and/or polishing processes are used in the fabrication process to protect the underlying layers from stress induced damages, such as cracks in the substrates of the optical coupling devices. Forming thinner (e.g., less than 200 nm) SiN based single tip dielectric structures can have low coupling efficiency and/or strong polarization dependent coupling loss.

The present disclosure provides example optical coupling devices with multi-tip dielectric structures having thicknesses less than about 200 nm. Such example optical coupling devices can provide improved optical coupling efficiency between the optical coupling devices and optical fibers, thus improving the optical coupling efficiency between the optical fibers and Si waveguides on Si photonic integrated circuits. The present disclosure also provides methods for fabricating these example optical coupling devices with fewer and less complicated processing steps than the methods for fabricating the single tip dielectric structured optical coupling devices without sacrificing the device performance of the example optical coupling devices.

In some embodiments, an example optical coupling device can include a semiconductor tapered structure and a multi-tip dielectric structure. The semiconductor tapered structure and the multi-tip dielectric structure can be disposed within a dielectric layer at horizontal planes different from each other. In some embodiments, the multi-tip dielectric structure can include an array of SiN layers or other suitable dielectric layers (e.g., silicon high oxide (SixO), aluminum oxide ($Al_2O_3$), aluminum nitride (AlN), lithium niobate ($LiNbO_3$), hafnium oxide ($HfO_2$), titanium oxide ($TiO_2$), zinc oxide (ZnO), and germanium oxide ($GeO_2$)). The lateral sides of the SiN layers facing the optical fibers form the tips of the multi-tip dielectric structure. Each tip has a vertical dimension along a Z-axis (e.g., thickness or height) less than about 200 nm (e.g., about 90 nm) and a horizontal dimension along a Y-axis width) greater than about 100 nm (e.g., about 200 nm to about 500 nm). Other suitable dimensions of the tips of the multi-tip dielectric structure are within the scope of the present disclosure.

Due to the multi-tip dielectric structure having thinner SiN layers compared to the SiN based single tip dielectric structure, the complexity of process steps and the number of process steps involved in the fabrication of the example optical coupling devices are reduced. In some embodiments, the multi-tip dielectric structure can be fabricated with one etching step. Unlike the fabrication process of the SiN based single tip dielectric structure, the fabrication process of the multi-tip dielectric structure may not need high resolution mask alignment, complicated processes, or nanometer-scale etching process control.

The multi-tip dielectric structure allows more flexibility in configuring the example optical coupling devices for achieving different optical mode sizes to match with optical fibers of different core sizes. By adjusting the dimensions of the SiN structures and the spacing between the SiN structures, different optical mode sizes can be optimized for maximum coupling efficiency with the optical fibers. In some embodiments, the multi-tip dielectric structure can include a two-dimensional array of SiN structures or other suitable dielectric structures to further improve the optical coupling efficiency between the example optical coupling device and optical fibers. In some embodiments, compared to the single tip dielectric structured optical coupling devices, the example optical coupling devices have higher tolerance for misalignment between the optical fibers and the multi-tip dielectric structures tor both polarizations. The optical loss is less than 1 dB with a 0.5 μm misalignment between the optical fibers and the multi-tip dielectric structures. The example optical coupling devices can also achieve low polarization dependent optical coupling loss.

Figure 1F:
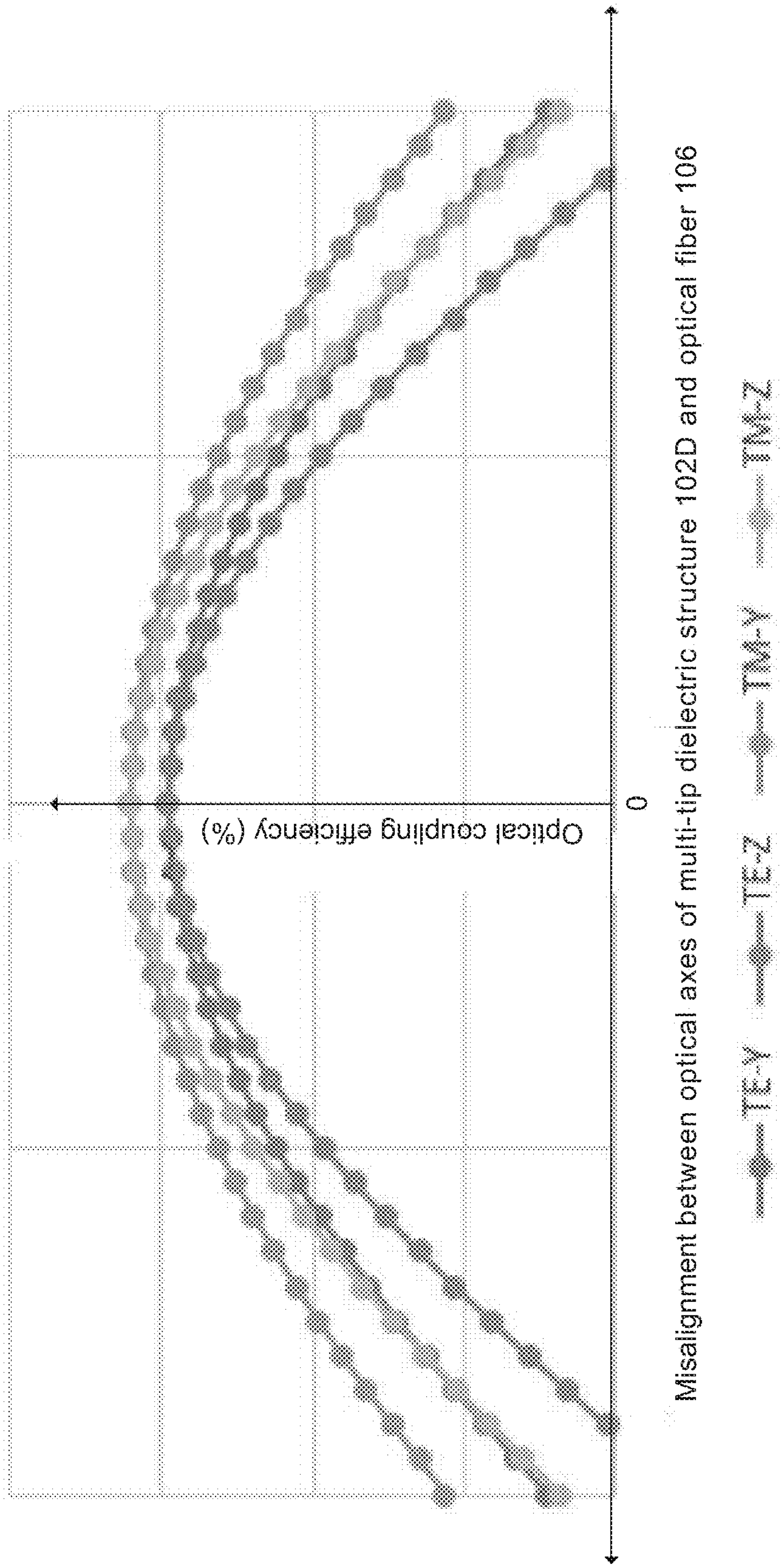

An optical system 100 having an optical coupling device 102 (also referred to as "edge coupler 102"), a Si-based waveguide 104, and an optical fiber 106 is described with reference to FIGS. 1A-1F, according to some embodiments. FIG. 1A illustrates a top view of optical system 100, according to some embodiments. FIGS. 1B-1E illustrate cross-sectional views along lines A-A, B-B, C-C, and D-D of FIGS. 1A-1B, according to some embodiments. FIG. 1F illustrates device characteristics of optical system 100, according to some embodiments.

Optical coupling device 102 can be configured to optically couple a Si-based waveguide 104 to an optical fiber 106. In some embodiments, optical coupling device 102 can include a substrate 102A, a dielectric layer 102B disposed on substrate 102A, a semiconductor tapered structure 102C disposed in a horizontal plane 108 within dielectric layer 102B, and a multi-tip dielectric structure 102D disposed in a horizontal plane 110 within dielectric layer 102B. Multi-tip dielectric structure 102D can be configured to collect light from optical fiber 106. Semiconductor tapered structure 102C can be configured to collect light from multi-tip dielectric structure 102D and transfer the collected light to waveguide 104. Substrate 102A can include a semiconductor material, such as silicon (Si), germanium (Ge), and silicon germanium (SiGe). In some embodiments, waveguide 104 can be disposed within dielectric layer 102B and can be in physical contact with semiconductor tapered structure 1020. In some embodiments, waveguide 104 and semiconductor tapered structure 102C can be a single semiconductor structure having the same semiconductor material, such as silicon (Si). In some embodiments, dielectric layer 102B can include an oxide material, such as silicon oxide ($SiO_2$).

In some embodiments, multi-tip dielectric structure 102D can include a one-dimensional ("1-D") array of dielectric layers extending between waveguide 104 and optical fiber 106 as shown in FIG. 1A. The 1-D array of dielectric layers can include a high-k dielectric material with a low refractive index, such as SiN, SixO, $Al_2O_3$, AlN, $LiNbO_3$, $HfO_2$, $TiO_2$, ZnO, $GeO_2$, and a combination thereof, or other suitable high-k dielectric materials. The refractive index of the dielectric material of the 1-D array of dielectric structures can be greater than the refractive index of optical fiber 106 and smaller than the refractive index of waveguide 104. The refractive index of the dielectric material of the 1-D array of dielectric structures can be smaller than the refractive index of semiconductor tapered structure 1020. Each of lateral sides 102Dt the dielectric structures facing optical fiber 106 forms a tip 102Dt of multi-tip dielectric structure 102D as shown in FIGS. 1A-1B and 1E. Tips 102Dt can be in physical contact with optical fiber 106 as shown in FIGS. 1A-1B and can be configured to collect light from optical fiber 106 during operation. In some embodiments, a gap (not shown) can be present between tips 102Dt and optical fiber 106, in which tips 102Dt can be optically coupled to optical fiber 106. Though tips 102Dt are shown to have rectangular cross-sections, tips 102Dt can have cross-sections of any geometric shape (e.g., circular, semi-circular, triangular, or polygonal).

The number of dielectric structures and the dimension of dielectric structures in the 1-D array of dielectric structures depend on the material property and the optical mode shape and size of optical fiber 106. The number and dimension of the dielectric structures can be adjusted during fabrication to substantially match the optical mode shapes and sizes of multi-tip dielectric structure 102D and those of optical fiber 106. In some embodiments, adjusting vertical dimensions 102Dh along a Z-axis of the dielectric layers of multi-tip dielectric structure 102D can adjust the optical mode size along a Z-axis of multi-tip dielectric structure 102D to match the optical mode of optical fiber 106. In some embodiments, adjusting horizontal dimensions 102Dw along a Y-axis of the dielectric layers of multi-tip dielectric structure 102D can adjust the optical mode shape along a Y-axis of multi-tip dielectric structure 102D to match the optical mode of optical fiber 106. Vertical and horizontal dimensions 102Dh and 102Dw of the dielectric structures are vertical and horizontal dimensions of tips 102Dt. Thus, adjustments in vertical dimension 102Dh and horizontal dimension 102Dw of the dielectric structures tune the optical modes of tips 102Dt that are optically coupled to optical fiber 106.

In some embodiments, multi-tip dielectric structure 102D can be fabricated with vertical dimension 102Dh and horizontal dimensions 102Dw and 102Dl such that multi-tip dielectric structure 102D can serve as a waveguide supporting only fundamental optical modes. In some embodiments, vertical dimension 102Dh can be equal to or less than about 200 nm about 90 nm) and horizontal dimension 102Dw can be equal to or greater than 100 nm (e.g., about 200 nm to about 500 nm) for multi-tip dielectric structure 102D to serve as a waveguide supporting only fundamental optical modes, Vertical spacing 102Ds between multi-tip dielectric structure 102D and substrate 102A can be equal to or greater than about 2 μm (e.g., about 2.1 μm to about 10 μm) or can be other suitable dimensions. A horizontal spacing along a Y-axis between adjacent dielectric structures of the multi-tip dielectric structure 102D can be equal to or greater than 200 nm (e.g., about 200 nm to about 500 nm) or can be other suitable dimensions. The number of dielectric structures can be between 2 and 20. If the number of dielectric structures is less than 2, multi-tip dielectric structure 102D may not adequately function as a waveguide supporting only fundamental optical modes. On the other hand, if the number of dielectric structures is greater than 20, the processing time increases, and consequently increases device manufacturing cost. Referring to FIG. 1F, in some embodiments, multi-tip dielectric structure 102D can have an optical coupling efficiency greater than 90% (e.g., about 91% to about 94%) or can be other suitable values and an optical coupling loss less than 1 dB with about 0.5 μm misalignment between optical axes (not shown) along a Y-axis of multi-tip dielectric structure 102D and optical fiber 106.

Figures 2A, 2B, 2C:
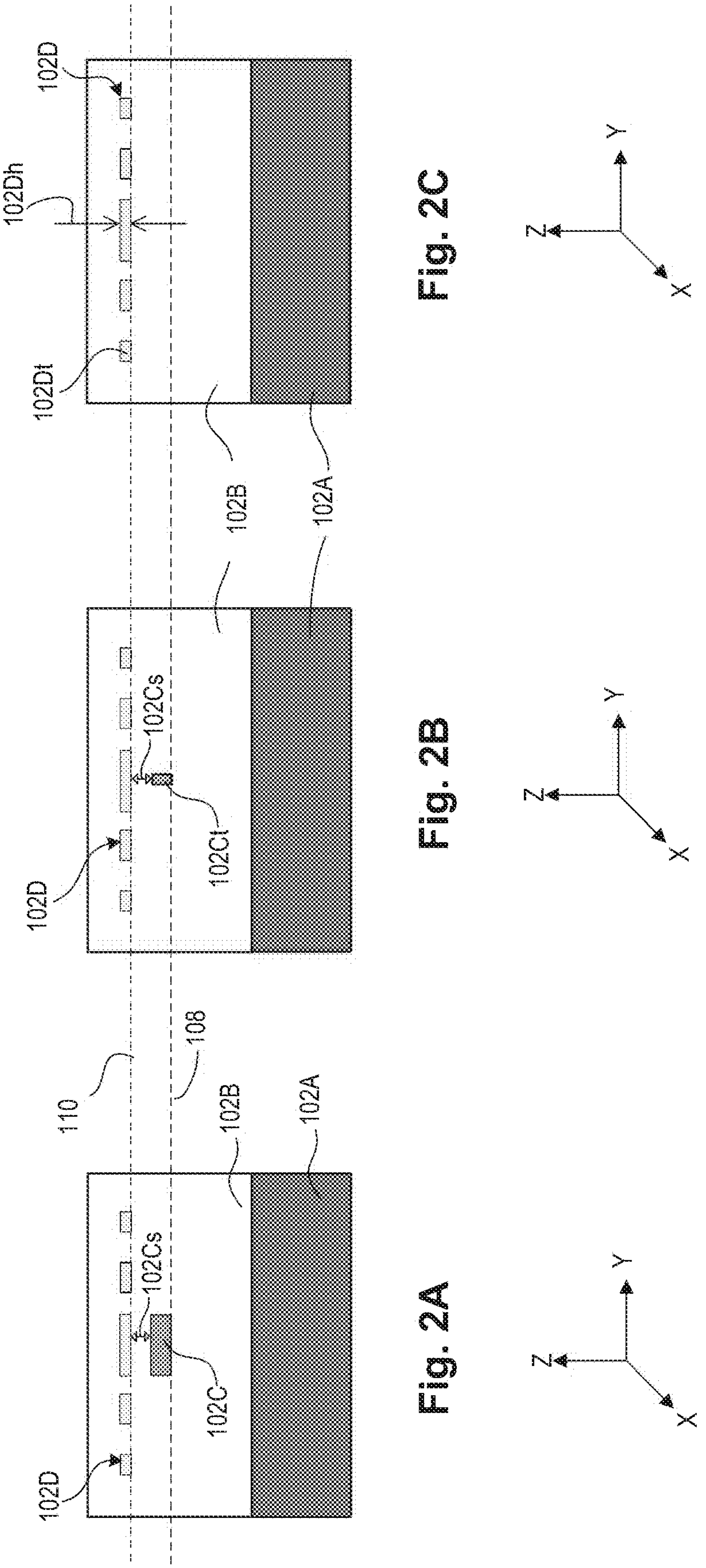
FIGS. 2A-2C illustrate cross-sectional views of an optical system, in accordance with some embodiments.

Instead of the dielectric structures of multi-tip dielectric structure 102D having the same horizontal dimensions 102Dw and 102Dl as shown in FIGS. 1C-1E, the horizontal dimensions along a Y-axis of one or more of the dielectric structures can be different from the other dielectric structures as shown in FIGS. 2A-2C. The horizontal dimensions along a Y-axis of adjacent dielectric structures can be different from each other as shown in FIGS. 2A-2C. A horizontal spacing along a Y-axis between adjacent dielectric structures can be different from each other as shown in FIGS. 2A-2C and can be equal to or greater than 100 nm (e.g., about 105 nm to about 500 nm) or can be other suitable dimensions. FIGS. 2A-2C illustrate cross-sectional views along lines B-B, C-C, and D-D of FIG. 1A for a different configuration of multi-tip dielectric structure 102D, according to some embodiments. The discussion of elements in FIGS. 1A-1E and 2A-2C with the same annotations applies to each other, unless mentioned otherwise.

Instead of or in addition to adjusting the number and dimensions of the dielectric structures of multi-tip dielectric structure 102D, the layout configuration of the dielectric structures can be adjusted for matching the optical mode shapes and sizes of a multi-tip dielectric structure 102D and those of aoptical fiber 106 as shown in FIGS. 3A-4C. FIGS. 3A-4C illustrate cross-sectional views along lines B-B, C-C, and D-D of FIG. 1A for different configurations of multi-tip dielectric structure 102D, according to some embodiments. The discussion of elements in FIGS. 1A-1E and 3A-4C with the same annotations applies to each other, unless mentioned otherwise.

Figures 3A, 3B, 3C:
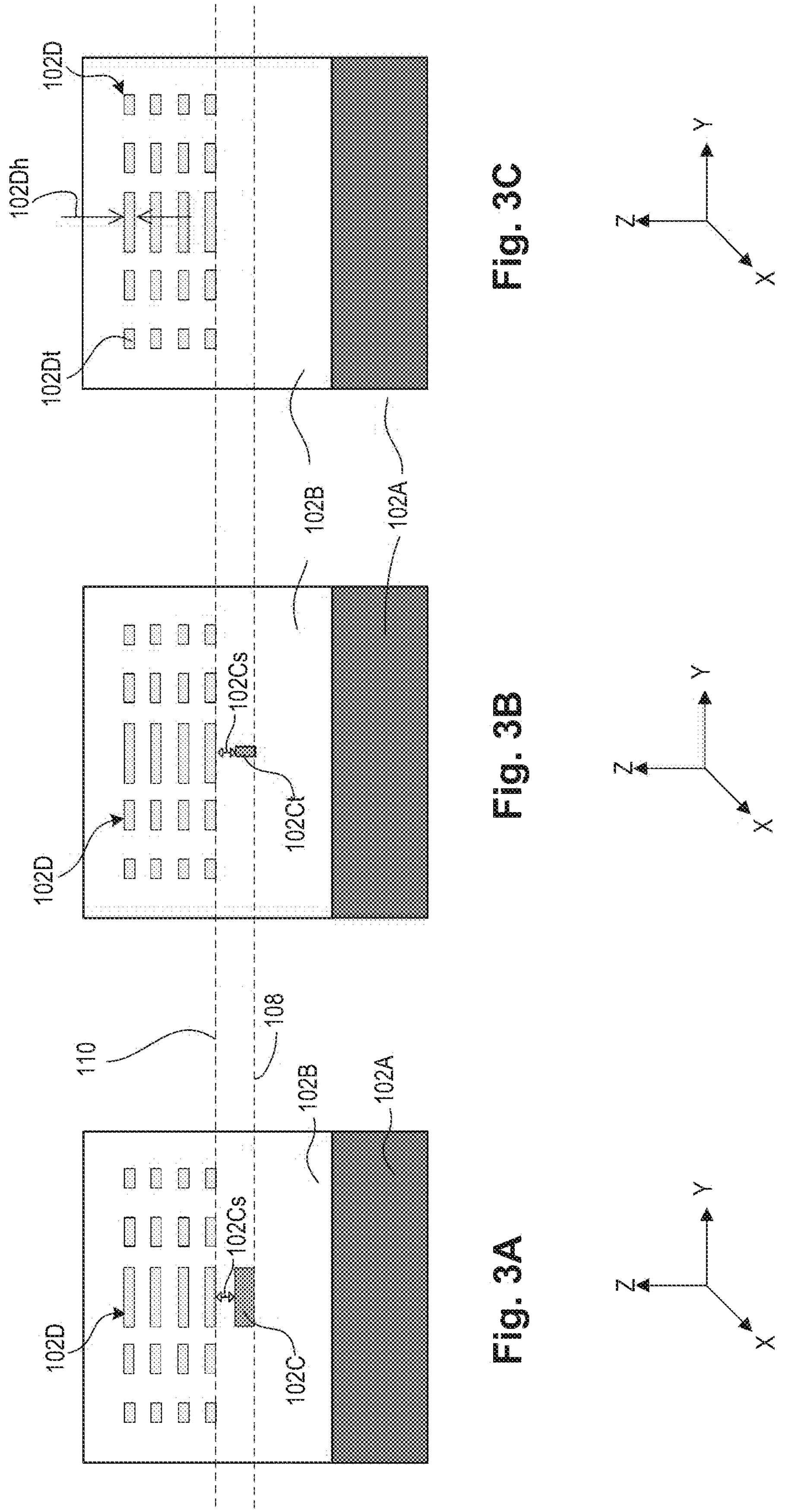
FIGS. 3A-3C illustrate cross-sectional views of an optical system, in accordance with some embodiments.
Figures 4A, 4B, 4C:
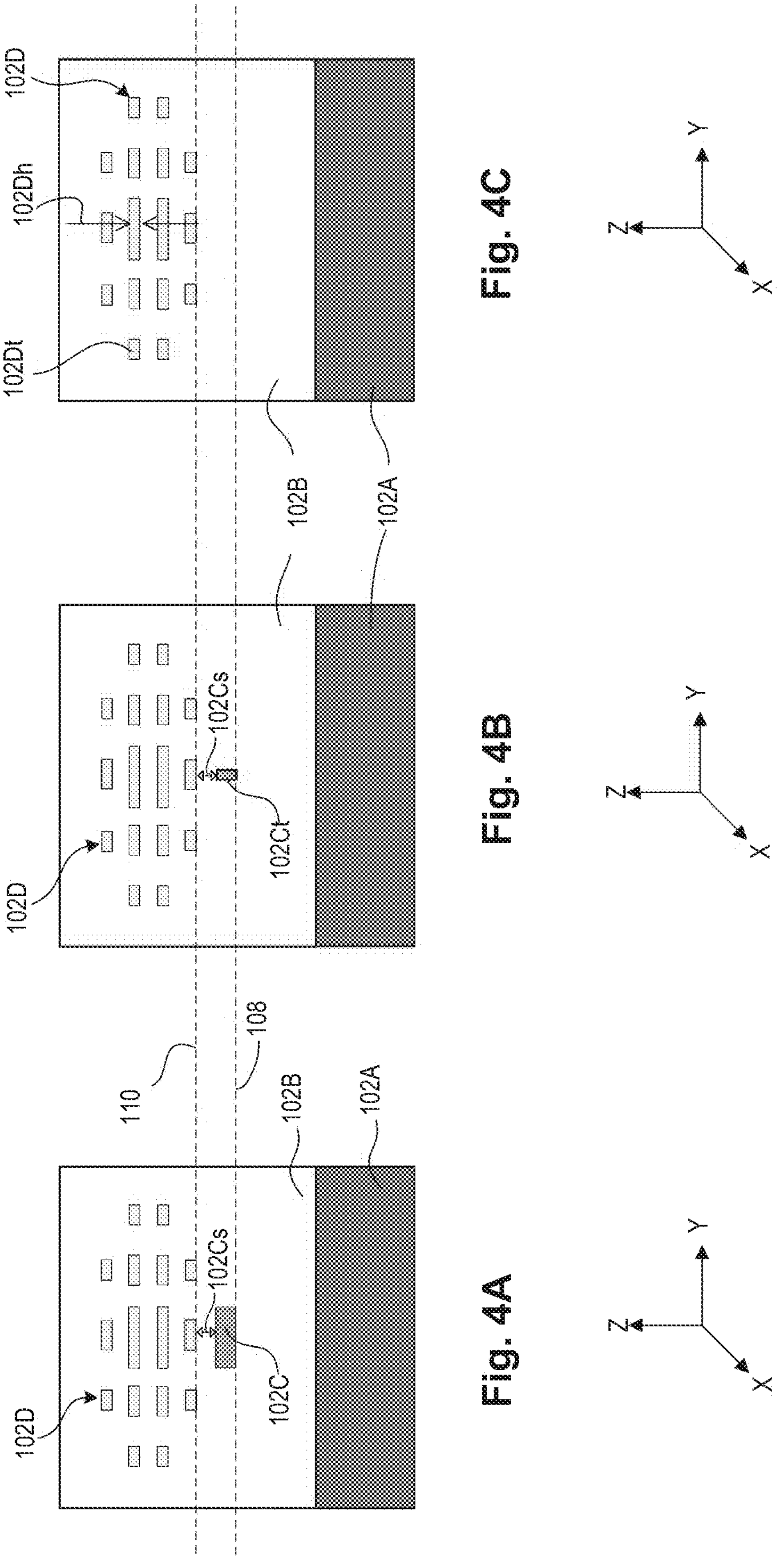
FIGS. 4A-4C illustrate cross-sectional views of an optical system, in accordance with some embodiments.

Referring to FIGS. 3A-4C, instead of the 1-D array of dielectric structures, multi-tip dielectric structure 102D can include a two-dimensional ("2-D") array of dielectric structures extending between waveguide 104 and optical fiber 106. The 2-D array of dielectric structures can include a high-k dielectric material with a low refractive index, such as SiN, SixO, $Al_2O_3$, AlN, $LiNbO_3$, $HfO_2$, $TiO_2$, ZnO, $GeO_2$, and a combination thereof, or other suitable high-k dielectric materials. The dielectric structures in each row of the 2-D array of dielectric structures can have the same dielectric material or can have different dielectric material. Each row of the 2-D array of dielectric structures can have the same arrangement of the dielectric structures as shown in FIGS. 3A-3C or each row can have a different arrangement of the dielectric structures as shown in FIGS. 4A-4C. A vertical spacing along a Z-axis between the dielectric structures in the 2-D array of dielectric structures can be greater than 50 nm (e.g., from about 50 nm to about 500 nm) or can be other suitable dimensions. The layout and dimensions of the dielectric structures in the 2-D array of dielectric structures can be configured such that multi-tip dielectric structure 102D can serve as a waveguide supporting only the fundamental optical modes. The 2-D array of dielectric structures provides increased flexibility in fabricating multi-tip dielectric structure 102D with a wider range of optical mode sizes for matching with a wider range of optical mode sizes of optical fiber 106.

In some embodiments, vertical spacing 102Cs along a Z-axis between multi-tip dielectric structure 102D and semiconductor tapered structure 102C can be greater than 20 nm (e.g., about 20 nm to about 500 nm) or can be other suitable dimensions. Horizontal dimension 102Ctw along a Y-axis of tip 1102Ct of semiconductor tapered structure 102C can range from about 50 nm to about 400 nm or can be other suitable dimensions. In some embodiments, base 102Cb of semiconductor tapered structure 102C can be substantially aligned with base 102Db of multi-tip dielectric structure 102D along a Y-axis as shown in FIG. 1A. A ratio of the horizontal dimension of base 102Cb along a Y-axis to the horizontal dimension of tip 1102Ct along a Y-axis can range from about 2 to about 20. A horizontal dimension along an X-axis of semiconductor tapered structure 102C can range from 10 μm to about 500 μm. The horizontal spacing along an X-axis shown in FIG. 1A between tip 102Ct and tips 102Dt can range from about 1 μm to about 100 μm.

Figures 5B, 5C, 5D:
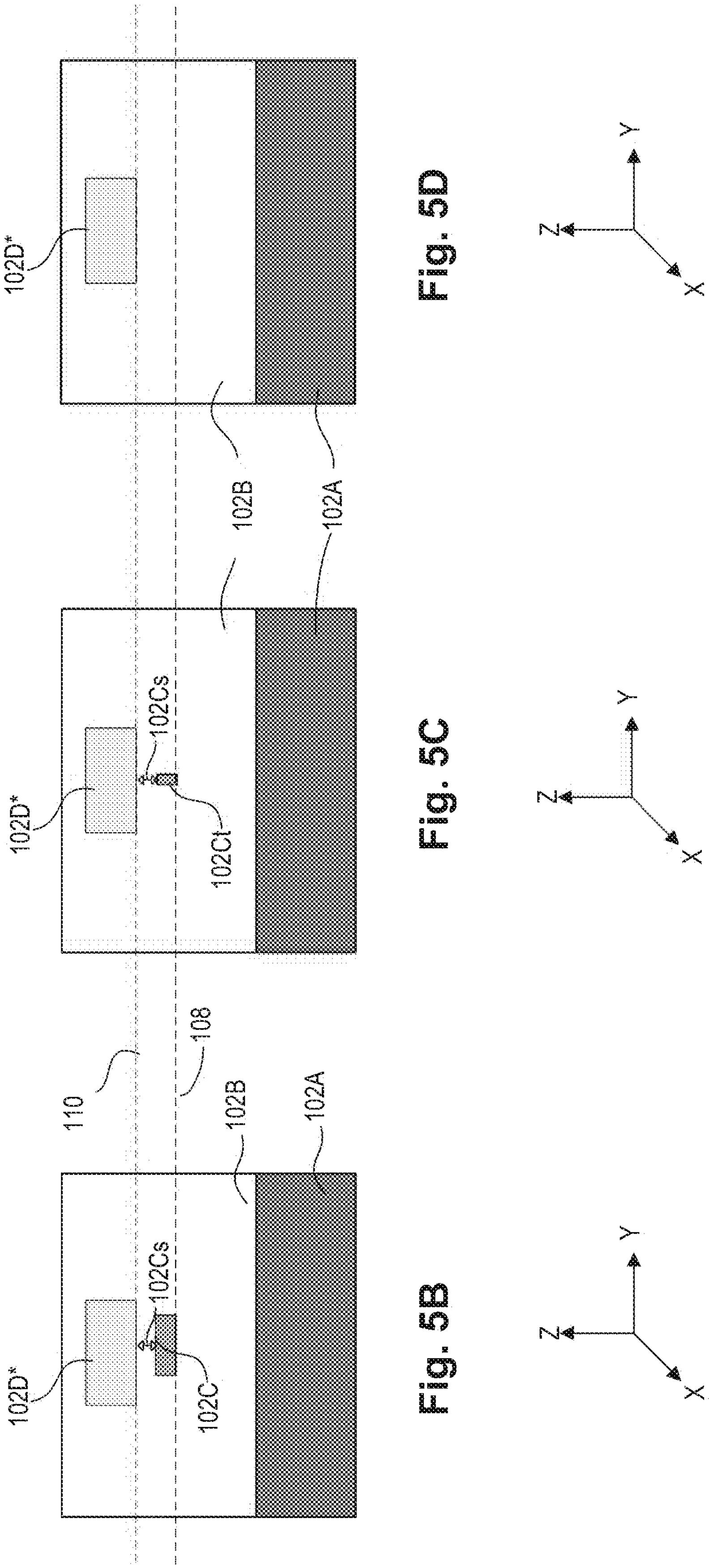

Referring to FIGS. 5A-5D, optical coupling device 102 can include a single tip dielectric structure 102D* instead of multi-tip dielectric structure 102D. FIG. 5A illustrates a top view of optical coupling device 102, according to some embodiments. FIGS. 5B-5D illustrate cross-sectional views along lines B-B, C-C, and D-D of FIG. 5A, according to some embodiments. The discussion of elements in FIGS. 1A-1E and 5A-5D with the same annotations applies to each other, unless mentioned otherwise.

Single tip dielectric structure 102D* can include a high-k dielectric material with a low refractive index, such as SiN, SixO, $Al_2O_3$, AlN, $LiNbO_3$, $HfO_2$, $TiO_2$, ZnO, $GeO_2$, and a combination thereof, or other suitable high-k dielectric materials. The refractive index of the dielectric material can be greater than the refractive index of optical fiber 106 and smaller than the refractive index of waveguide 104. The refractive index of the dielectric material can be smaller than the refractive index of semiconductor tapered structure 102C. Lateral side 102Dt* of single tip dielectric structure 102D* facing optical fiber 106 forms a tip 102Dt* of single tip dielectric structure 102D*. Tip 102Dt* can be in physical contact with optical fiber 106 as shown in FIG. 5A and can be configured to collect light from optical fiber 106 during operation. Though tip 102Dt* is shown to have a rectangular cross-section, tip 102Dt* can have a cross-section of any geometric shape (e.g., circular, semi-circular, triangular, or polygonal).

Similar to multi-tip dielectric structure 102D, vertical spacing 102Cs can be present between semiconductor tapered structure 102C and single tip dielectric structure 102D* as shown in FIGS. 5B-5C to reduce back reflection of light and tune the evanescent coupling strength between the semiconductor tapered structure 1020 and the single tip dielectric structure 102D*. In some embodiments, there is a horizontal spacing along an X-axis shown in FIG. 5A between tip 102Ct and tip 102Dt*. This horizontal spacing between tip 102Ct and tip 102Dt* can range from about 1 μm to about 100 μm. In some embodiments, base 102Cb of semiconductor tapered structure 102C can be aligned with base 102Db* of single tip dielectric structure 102D* along a Y-axis as shown in FIG. 5A. In some embodiments, a vertical dimension of single tip dielectric structure 102D* along a Z-axis can range from about 200 nm to about 1000 nm and a horizontal dimension of single tip dielectric structure 102D* along a Y-axis can range from about 200 nm to about 1000 nm. Other suitable dimensions of single tip dielectric structure 102D* are within the scope of the present disclosure.

Figure 6A:
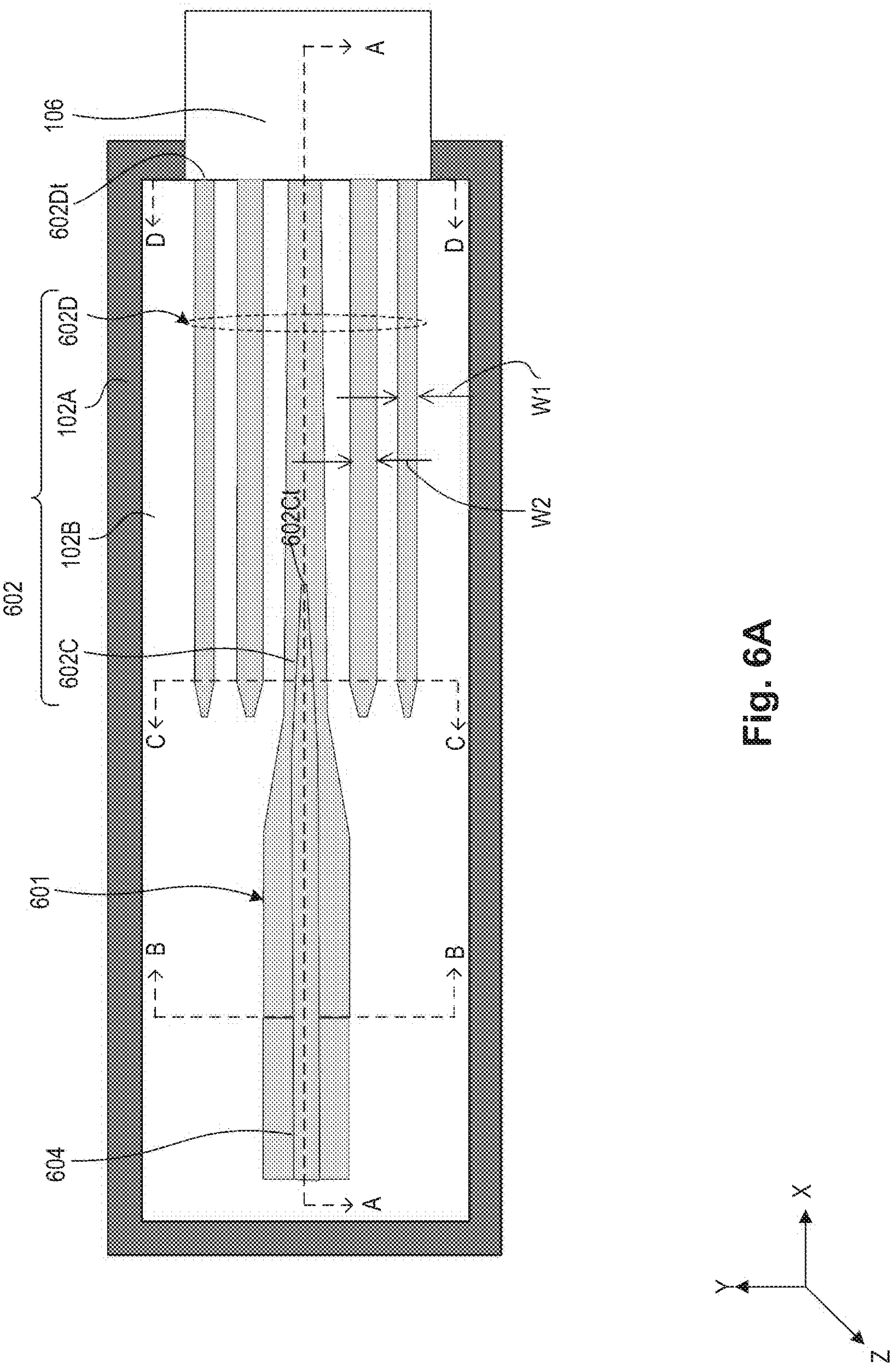
FIGS. 6A-6E illustrate top and cross-sectional views of an optical system, in accordance with some embodiments.

An optical system 600 having an optical coupling device 602 (also referred to as "edge coupler 602"), Si-based rib waveguide 604, and optical fiber 106 is described with reference to FIGS. 6A-6E, according to some embodiments. FIG. 6A illustrates a top view of optical system 600, according to some embodiments. FIGS. 6B-6E illustrate cross-sectional views along lines A-A, B-B, C-C, and D-D of FIGS. 6A-6B, according to some embodiments. The discussion of elements in FIGS. 1A-1E and 6A-6E with the same annotations applies to each other, unless mentioned otherwise. Optical coupling device 602 can be configured to optically couple Si-based waveguide 604 to optical fiber 106.

Figure 6B:
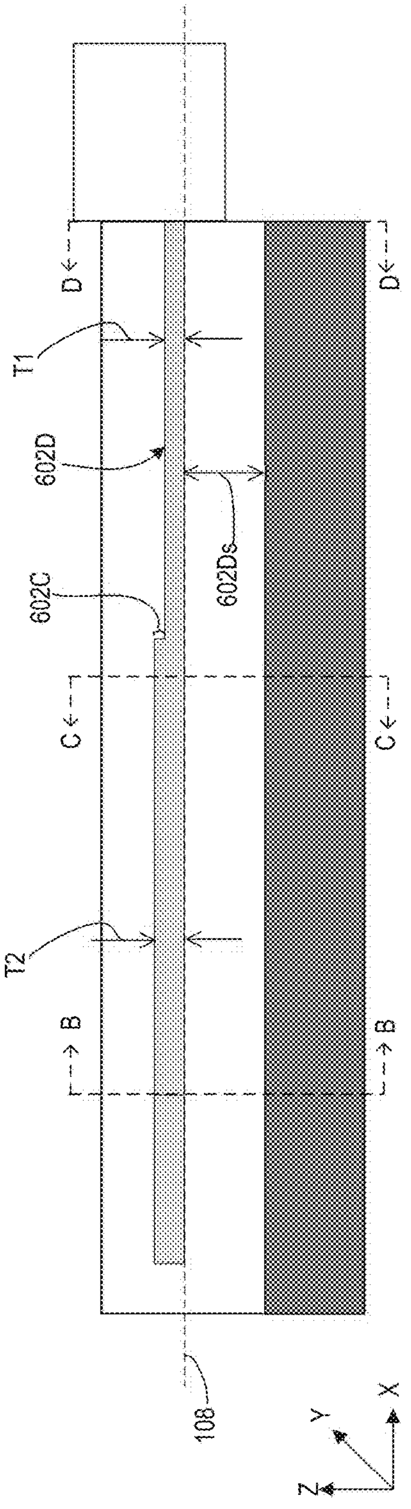

In some embodiments, optical coupling device 602 can include substrate 102A, dielectric layer 102B disposed on substrate 102A, a semiconductor tapered structure 602C disposed on a multi-tip semiconductor structure 602D disposed within dielectric layer 102B, Multi-tip semiconductor structure 602D can include a 1-D array of semiconductor structures. Semiconductor tapered structure 602C can be a raised region on one of the semiconductor structures of the 1-D array of semiconductor structures as shown in FIGS. 6B-6D. Semiconductor tapered structure 602C and the semiconductor structure of the 1-D array of semiconductor structures underlying semiconductor tapered structure 602C form a single semiconductor structure 601 that includes a semiconductor material, such as silicon (Si). The semiconductor structures of the 1-D array of semiconductor structures that do not overlap with semiconductor tapered structure 602C can include the same semiconductor material as semiconductor tapered structure 602C. Multi-tip semiconductor structure 602D can be configured to collect light from optical fiber 106. Semiconductor tapered structure 602C can be configured to collect light from multi-tip semiconductor structure 602D and transfer the collected light to waveguide 604. Substrate 102A can include a semiconductor material, such as silicon (Si), germanium (Ge), and silicon germanium (SiGe). In some embodiments, waveguide 604 and optical coupling device 602 can be a single semiconductor structure having the same semiconductor material, such as silicon (Si). In some embodiments, dielectric layer 102B can include an oxide material, such as silicon oxide ($SiO_2$).

Figure 6E:
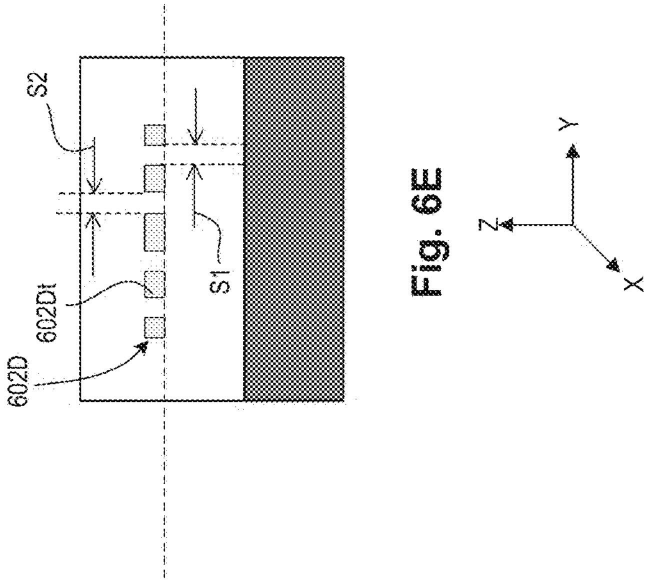
Figure 6D:
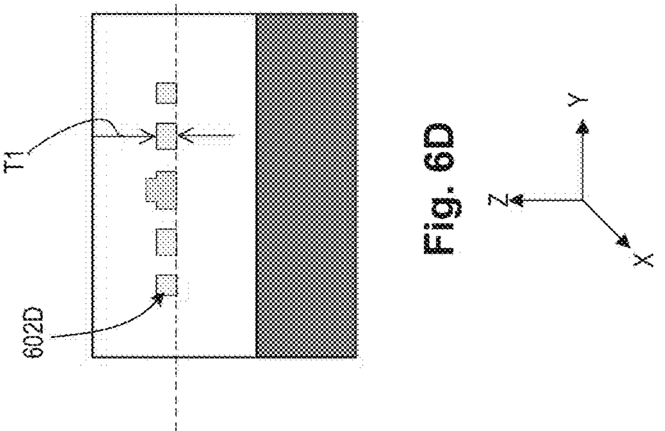
Figure 6C:
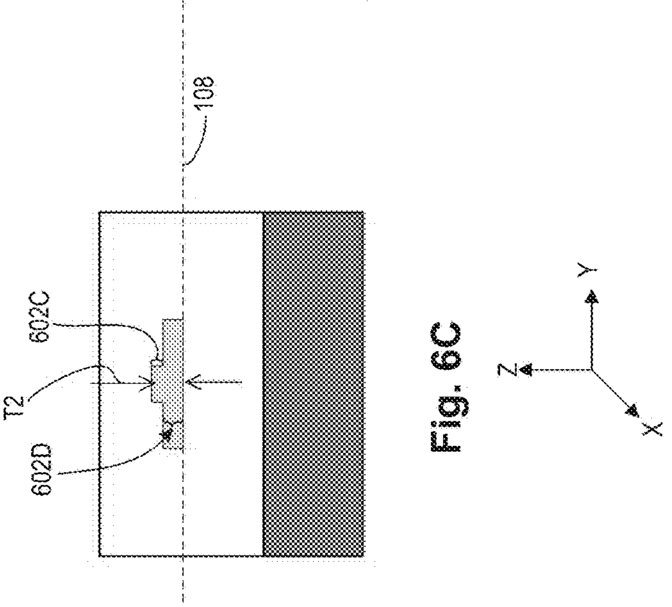

Each of lateral sides 602Dt of multi-tip semiconductor structure 602D facing optical fiber 106 forms a tip 602Dt of multi-tip semiconductor structure 602D as shown in FIGS. 6A-69 and 6E. Tips 602Dt can be in physical contact with optical fiber 106 as shown in FIGS. 6A-6B and can be configured to collect light from optical fiber 106 during operation. Though tips 602Dt are shown to have rectangular cross-sections, tips 602Dt can have cross-sections of any geometric shape (e.g., circular, semi-circular, triangular, or polygonal).

The number of tips 602Dt and the dimension of the semiconductors structures in the 1-D array depend on the optical mode shape and size of optical fiber 106. The number and dimension of the semiconductors structures can be adjusted during fabrication to substantially match the optical mode shapes and sizes of multi-tip semiconductor structure 602D and those of optical fiber 106. In some embodiments, adjusting vertical dimensions T1 and T2 along a Z-axis of multi-tip semiconductor structure 602D can adjust the optical mode size of multi-tip semiconductor structure 602D to match the optical mode size of optical fiber 106. In some embodiments, adjusting horizontal dimensions along a Y-axis of multi-tip semiconductor structure 602D, such as W1, W2, S1, S2, can adjust the optical mode shape of multi-tip semiconductor structure 602D to match the optical mode shape of optical fiber 106.

In some embodiments, multi-tip semiconductor structure 602D can be fabricated with vertical dimension T1-T2 and horizontal dimensions W1-W2, S1-S2 such that multi-tip semiconductor structure 602D can serve as a waveguide with only fundamental optical modes. In some embodiments, vertical dimension T1 can range from about 50 nm to about 200 nm, and vertical dimension T2 can range from about 100 nm to about 500 nm. Horizontal dimensions W1-W2 can be equal to or less than 400 nm (e.g., about 50 nm to about 200 nm). In some embodiments, horizontal dimensions W1-W2 can be equal to or different from each other. Vertical spacing 602Ds between multi-tip semiconductor structure 602D and substrate 102A can be equal to or greater than about 2 μm about 2.1 μm to about 10 μm). Horizontal spacings S1-S2 along a Y-axis between adjacent semiconductor structures of the 1-D array of multi-tip semiconductor structure 602D can be equal to or greater than 100 nm (e.g., about 100 nm to about 1000 nm). In some embodiments, horizontal spacings S1-S2 can be equal to or different from each other. The number of semiconductor structures of the 1-D array can be about 2 to about 20. In some embodiments, as shown in FIG. 6A, the horizontal dimension of semiconductor tapered structure 602C along a Y-axis is smaller than the horizontal dimension of the semiconductor layer of the 1-D array underlying semiconductor tapered structure 602C.

The cross-sectional shapes of optical coupling devices 102 and 602 and their elements are illustrative and are not intended to be limiting.

Figure 7:
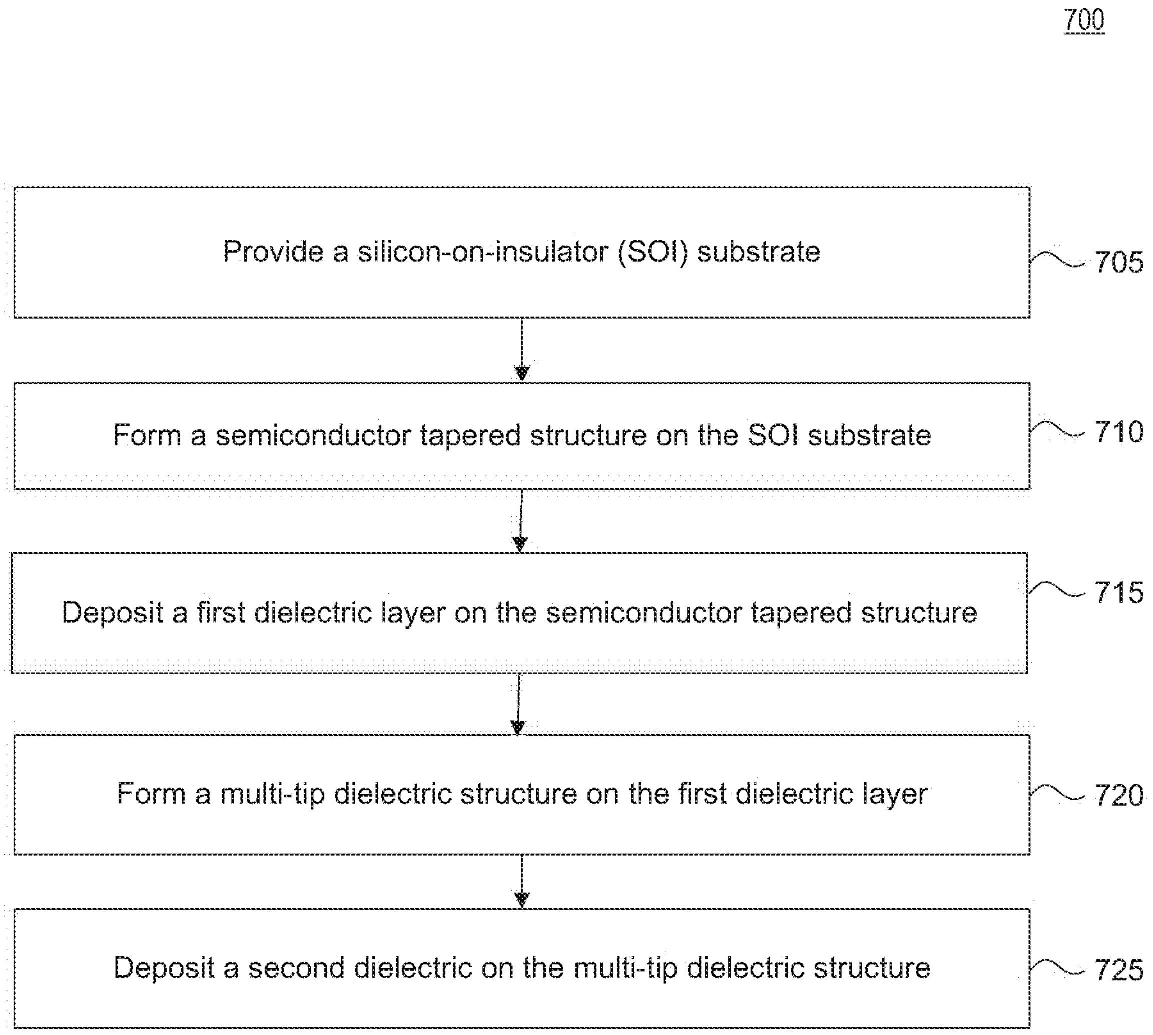
FIG. 7 is a flow diagram of a method for fabricating an optical coupling device, in accordance with some embodiments.

FIG. 7 is a flow diagram of an example method 700 for fabricating optical coupling device 102, according to some embodiments. For illustrative purposes, the operations illustrated in FIG. 7 will be described with reference to the example fabrication process for forming optical coupling device 102 as illustrated in FIGS. 8A-8F, FIGS. 8A-8F are cross-sectional views along line B-B of optical coupling device 102 at various stages of fabrication, according to some embodiments. Operations can be performed in a different order or not performed depending on specific applications. Method 700 may not produce a complete optical coupling device 102. Accordingly, additional processes can be provided before, during, and after method 700, and that some other processes may only be briefly described herein. Elements in FIGS. 8A-8F with the same annotations as elements in FIGS. 1A-1E are described above.

Figures 8A, 8B, 8C, 8D, 8E, 8F:
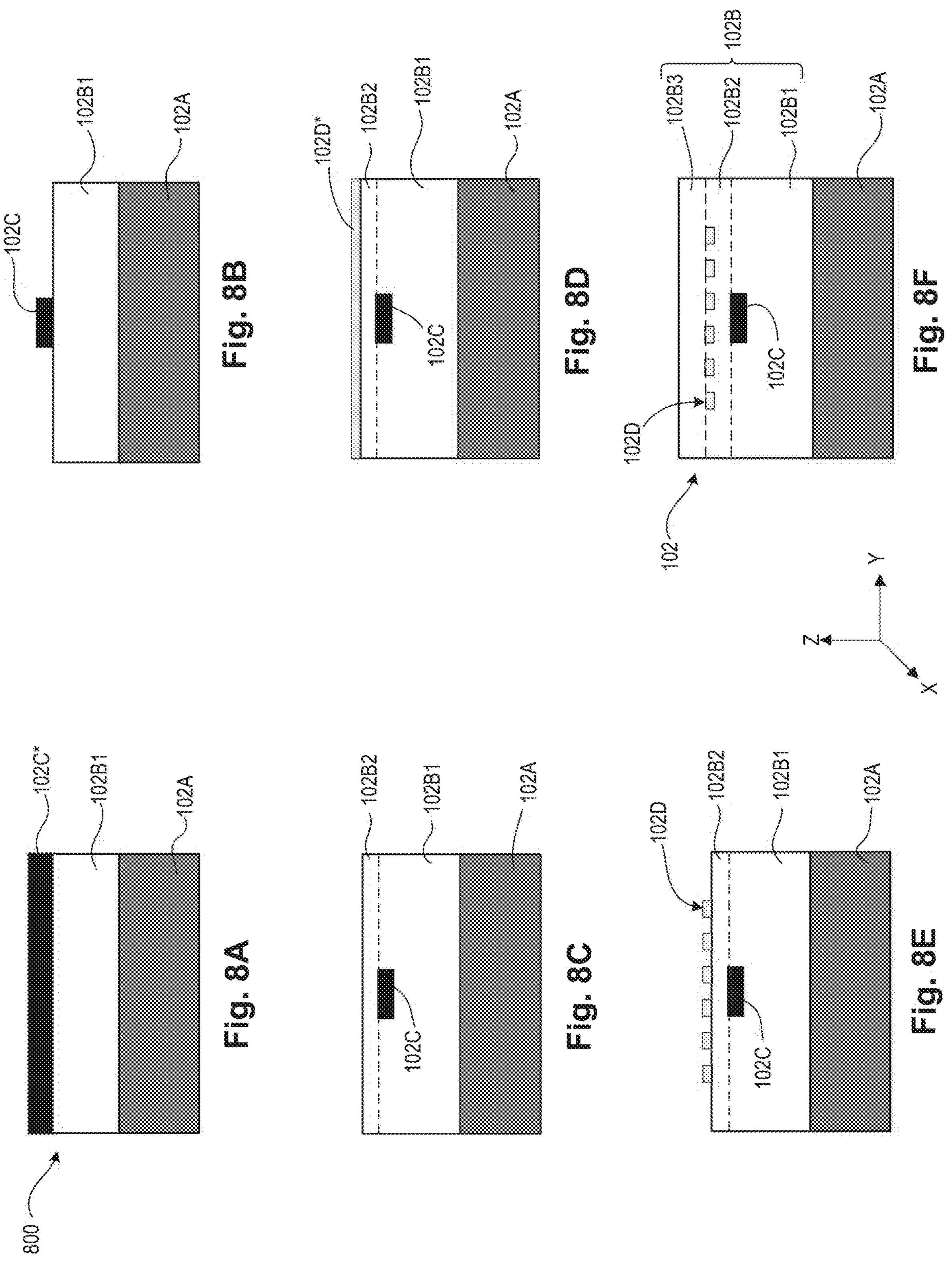
FIGS. 8A-8F illustrate cross-sectional views of an optical coupling device at various stages of its fabrication process, in accordance with some embodiments.

In operation 705, a silicon-on-insulator (SOI) substrate is provided. For example, as shown in FIG. 8A, an SOI substrate 800 can be provided. SOI substrate 800 can include a substrate 102A, a dielectric layer 102B1 disposed on substrate 102A, and a silicon layer 102C* disposed on dielectric layer 102B1. During subsequent processing, silicon layer 102C* can be processed to form semiconductor tapered structure 102C. In some embodiments, dielectric layer 102B1 can include an oxide material, such as silicon oxide ($SiO_2$).

Referring to FIG. 7, in operation 710, a semiconductor tapered structure is formed on the SOI substrate. For example, as shown in FIG. 8B, semiconductor tapered structure 102C can be formed on 501 substrate 800. The formation of semiconductor tapered structure 102C can include sequential operations of (i) thinning down silicon layer 102C* to a thickness of about 50 nm to about 200 nm and (ii) patterning and etching the thinned down silicon layer 102C* to form the structure of FIG. 8B.

Referring to FIG. 7, in operation 715, a first dielectric layer is deposited on the semiconductor tapered structure. For example, as shown in FIG. 8C, a first dielectric layer 102B2 can be deposited on the structure of FIG. 8B to form the structure of FIG. 8C. The deposition of first dielectric layer 102B2 can include blanket depositing about 50 nm to about 800 nm thick dielectric material on the structure of FIG. 8B with a PECVD process. The deposited dielectric material can be the same dielectric material included in dielectric layer 102B1.

Referring to FIG. 7, in operation 720, a multi-tip dielectric structure can be formed on the first dielectric layer. For example, as shown in FIG. 8E, multi-tip dielectric structure 102D can be formed on first dielectric layer 102B2. The formation of multi-tip dielectric structure 102D can include sequential operations of (i) blanket depositing about 50 nm to about 200 nm thick high-k and low refractive index dielectric material on the structure of FIG. 8C with an ALD or a CVD process to form dielectric layer 102D* as shown in FIG. 8D, and (ii) patterning and etching dielectric layer 102D* to form the structure of FIG. 8E. Dielectric layer 102D* can include high-k and low refractive index dielectric material, such as SiN, SixO, $Al_2O_3$, AlN, $LiNbO_3$, $HfO_2$, $TiO_2$, ZnO, $GeO_2$, or a combination thereof, or other suitable high-k dielectric materials.

Referring to FIG. 7, in operation 725, a second dielectric layer is deposited on the multi-tip dielectric structure. For example, as shown in FIG. 8F, a second dielectric layer 102B3 can be deposited on the structure of FIG. 8E to form the structure of FIG. 8F. The deposition of second dielectric layer 102B3 can include blanket depositing about 100 nm to about 1000 nm thick dielectric material on the structure of FIG. 8E with a PECVD process. The deposited dielectric material can be the same dielectric material included in dielectric layers 102B1-102B2. Dielectric layers 102B1-102B3 can form dielectric layer 102B of optical coupling device 102.

The present disclosure provides example optical coupling devices (e.g., optical coupling device 102) with multi-tip dielectric structures (e.g., multi-tip dielectric structures 102D) having thickness less than about 200 nm. Such example optical coupling devices can provide improved optical coupling efficiency between optical coupling devices and optical fibers (e.g., optical fiber 106), thus improving the optical coupling efficiency between the optical fibers and Si waveguides (e.g., Si waveguide 104) on Si photonic integrated circuits. The present disclosure also provides methods for fabricating these example optical coupling devices with fewer and less complicated processing steps than the methods for fabricating the single tip dielectric structured optical coupling devices without sacrificing the device performance of the example optical coupling devices.

In some embodiments, an example optical coupling device can include a semiconductor tapered structure (e.g., semiconductor tapered structure 102C) and a multi-tip dielectric structure (e.g., multi-tip dielectric structures 102D). The semiconductor tapered structure and the multi-tip dielectric structure can be disposed within a dielectric layer stack at horizontal planes different from each other. In some embodiments, the multi-tip dielectric structure can include an array of SiN structures or other suitable dielectric layers. In some embodiments, each tip has a vertical dimension along a Z-axis less than about 200 nm (e.g., about 90 nm) and a horizontal dimension along a Y-axis greater than about 200 nm (e.g., about 300 nm to about 500 nm). Other suitable dimensions of the tips of the multi-tip dielectric structure are within the scope of the present disclosure.

Due to the multi-tip dielectric structure having thinner SiN layers compared to the SiN based single tip dielectric structure, the complexity of process steps and the number of process steps involved in the fabrication of the example optical coupling devices are reduced. In some embodiments, the multi-tip dielectric structure can be fabricated with one etching step. Unlike the fabrication process of the SiN based single tip dielectric structure, the fabrication process of the multi-tip dielectric structure may not need high resolution mask alignment, complicated processes, and nm-scale etching process control.

The multi-tip dielectric structure allows more flexibility in configuring the example optical coupling devices for achieving different optical mode sizes to match with optical fibers of different core sizes. By adjusting the dimensions of the SiN structures and the spacing between the SiN structures, different optical mode sizes can be optimized for maximum coupling efficiency with the optical fibers. In some embodiments, compared to the single tip dielectric structured optical coupling devices, the example optical coupling devices have higher tolerance for misalignment between the optical fibers and the multi-tip dielectric structures for both polarizations. The optical loss is less than 1 dB with a 0.5 μm misalignment between the optical fibers and the multi-tip dielectric structures.

In some embodiments, an optical system includes a substrate, a waveguide disposed on the substrate, an optical fiber optically coupled to the waveguide, and an optical coupling device disposed between the optical fiber and the waveguide. The optical coupling device configured to optically couple the optical fiber to the waveguide. The optical coupling device includes a dielectric layer disposed on the substrate, a semiconductor tapered structure disposed in a first horizontal plane within the dielectric layer, and a multi-tip dielectric structure disposed in a second horizontal plane within the dielectric layer. The first and second horizontal planes are different from each other.

In some embodiments, an optical system includes a substrate, a waveguide disposed on the substrate, an optical fiber optically coupled to the waveguide, and an optical coupling device disposed between the optical fiber and the waveguide. The optical coupling device configured to optically couple the optical fiber to the waveguide. The optical coupling device includes a dielectric layer disposed on the substrate, a multi-tip semiconductor structure having an array of semiconductor layers disposed within the dielectric layer, and a semiconductor tapered structure disposed on and in physical contact with the multi-tip semiconductor structure.

In some embodiments, a method for fabricating an optical coupling device includes forming a semiconductor tapered structure on a silicon-on-insulator (SOI) substrate, depositing a first dielectric layer on the semiconductor tapered structure, forming a multi-tip dielectric structure with an array of dielectric layers on the first dielectric structure, and depositing a second dielectric layer on the multi-tip dielectric structure.

The foregoing disclosure outlines features of several embodiments so that those skilled in the art may better understand the aspects of the present disclosure. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions, and alterations herein without departing from the spirit and scope of the present disclosure.

What is claimed is:

1. An optical system, comprising:
- a substrate;
- a waveguide disposed on the substrate;
- an optical fiber optically coupled to the waveguide; and
- an optical coupling device extending between the optical fiber and the waveguide, wherein the optical coupling device comprises:
  - a dielectric layer disposed on the substrate;
  - a tapered structure, disposed in the dielectric layer, comprising:
    - a base end facing the waveguide;
    - a tip end facing the optical fiber and in contact with the dielectric layer; and
    - a sidewall profile with a decreasing slope from the base end to the tip end; and
  - a multi-tip nitride structure, disposed above the tapered structure in the dielectric layer.

2. The optical system of claim 1, wherein the multi-tip nitride structure comprises a two-dimensional array of nitride structures disposed in the dielectric layer.

3. The optical system of claim 1, wherein the multi-tip nitride structure comprises a two-dimensional array of nitride structures, and wherein a number of the nitride structures in a first row of the two-dimensional array is less than a number of the nitride structures in a second row of the two-dimensional array.

4. The optical system of claim 1, wherein the multi-tip nitride structure comprises a two-dimensional array of nitride structures, and wherein dimensions of the nitride structures in a first column of the two-dimensional array are greater than dimensions of the nitride structures in a second column of the two-dimensional array.

5. The optical system of claim 1, wherein dimensions of adjacent tips in the multi-tip nitride structure are different from each other.

6. The optical system of claim 1, wherein a first tip of the multi-tip nitride structure overlapping the tapered structure is wider than a second tip of the multi-tip nitride structure that is non-overlapping with the tapered structure.

7. The optical system of claim 1, wherein the tapered structure comprises a semiconductor material.

8. The optical system of claim 1, wherein the multi-tip nitride structure overlaps the tapered structure.

9. The optical system of claim 1, wherein the multi-tip nitride structure comprises an array of tips that are in contact with the optical fiber.

10. The optical system of claim 1, wherein the multi-tip nitride structure comprises an array of nitride structures having silicon nitride material.

11. The optical system of claim 1, wherein the multi-tip nitride structure comprises a nitride material with a refractive index that is greater than a refractive index of the optical fiber and that is smaller than a refractive index of a material of the tapered structure.

12. The optical system of claim 1, wherein the base end of the tapered structure is substantially aligned with a base of the multi-tip nitride structure.

13. An optical system, comprising:

a substrate;

a dielectric layer disposed on the substrate;

a waveguide disposed in the dielectric layer;

an optical coupling device, comprising:

a tapered structure disposed in the dielectric layer and adjacent to the waveguide;

a multi-tip nitride structure disposed on the tapered structure; and an optical fiber disposed adjacent to the multi-tip nitride structure, wherein the optical coupling device extends between the optical fiber and the waveguide, and wherein the tapered structure comprises:

a base end facing the waveguide;

a tip end facing the optical fiber and in contact with the dielectric layer; and a sidewall profile with a decreasing slope from the base end to the tip end.

14. The optical system of claim 13, wherein the multi-tip nitride structure comprises a two-dimensional array of nitride structures.

15. The optical system of claim 13, wherein the tapered structure and the waveguide comprise a same semiconductor material.

16. The optical system of claim 13, wherein each lateral side of the multi-tip nitride structure is in physical contact with the optical fiber.

17. A optical system, comprising:

a substrate;

a waveguide disposed on the substrate;

an optical coupling device, comprising:

a semiconductor tapered structure disposed adjacent to the waveguide;

a multi-tip nitride structure disposed on the semiconductor tapered structure; and an optical fiber disposed adjacent to the multi-tip nitride structure, wherein the optical coupling device extends between the optical fiber and the waveguide, and wherein the semiconductor tapered structure comprises:

a base end facing the waveguide;

a tip end facing the optical fiber and in contact with a dielectric layer; and a sidewall profile with a decreasing slope from the base end to the tip end.

18. The optical system of claim 17, wherein the dielectric layer surrounds the waveguide, the semiconductor tapered structure, and the multi-tip nitride structure.

19. The optical system of claim 17, wherein the multi-tip nitride structure comprises a multi-tip silicon nitride structure.

20. The optical system of claim 17, wherein the semiconductor tapered structure comprises a silicon layer.

* * * * *